(12) United States Patent
Tran

(10) Patent No.: US 9,677,854 B1
(45) Date of Patent: Jun. 13, 2017

(54) FIREARMS MOUNTING RAIL

(71) Applicant: Si Tran, Lawrenceville, GA (US)

(72) Inventor: Si Tran, Lawrenceville, GA (US)

(*) Notice: Subject to any disclaimer, the term of this patent is extended or adjusted under 35 U.S.C. 154(b) by 0 days.

(21) Appl. No.: 15/213,316

(22) Filed: Jul. 18, 2016

Related U.S. Application Data

(60) Provisional application No. 62/289,657, filed on Feb. 1, 2016.

(51) Int. Cl.
F41A 15/00 (2006.01)
F41G 11/00 (2006.01)
F16B 1/00 (2006.01)

(52) U.S. Cl.
CPC .............. *F41G 11/003* (2013.01); *F16B 1/00* (2013.01); *F16B 2001/0035* (2013.01)

(58) Field of Classification Search
CPC .................................. F41C 27/00; F41G 1/38
USPC ....................................................... 42/90, 124
See application file for complete search history.

(56) References Cited

U.S. PATENT DOCUMENTS

| 7,886,476 B1* | 2/2011 | Swan | F41C 27/00 403/374.5 |
| 2013/0036646 A1* | 2/2013 | Rubac | F41C 23/16 42/90 |
| 2016/0076846 A1* | 3/2016 | Melancon | F41A 23/16 42/94 |
| 2016/0146560 A1* | 5/2016 | Peterson | F41A 11/02 42/71.01 |

* cited by examiner

*Primary Examiner* — J. Woodrow Eldred
(74) *Attorney, Agent, or Firm* — F. Russell Denton; Denton Intellectual Property Law Firm, LLC

(57) ABSTRACT

A firearm magnetic locking accessory rail that allows for quick one step attachment or detachment. By having two components connecting together in an interlocking design, the rail allows for easy firearm accessories configuration to meet any shooting requirement. The two magnets in the railing system act as the locking and precision elements that provide sighting accessories same accuracy when remove and re-attach to the firearm.

17 Claims, 3 Drawing Sheets

FIREARMS MOUNTING RAIL

BACKGROUND OF THE INVENTION

Firearms mounting system such as the standard MID-STD-1913, or better known as the "picatinny rail", allows modern firearms to attach optics and accessories to it for sight enhancement purposes. The accessories are able to attach to the firearm picatinny rail by fitting over and locking itself on a set of flanges.

Common firearm accessory mounting devices for scope, red-dot sight, flashlight, laser, iron sights, bipod, and other accessories use standard nut and screw to fasten and lock securely to the firearm picatinny rail. Other mounting devices use bottom, levers, latches, or other mechanisms to lock or unlock the mounting device.

Presently these mounting devices do not provide a quick and simple solution to attach or detach accessories from the firearm picatinny rail without requiring multiple steps or tools to do the task.

With the present invention mounting rail, a person can quickly attach or detach firearm accessories in one simple step or action by means of inserting or pulling apart the accessory from the slot on the present invention, no tools or extra fastening device manipulation require. The present invention locks itself when inserting the two main components together or unlocking when pulled apart.

BRIEF SUMMARY OF THE INVENTION

The present invention is a magnetic mounting rail system that allows for quick attachment of firearm accessories by means of magnetic attractive force. The magnetic attractive force acts as a locking, holding, and a precision mechanism of the device. When the two main parts are inserted together in a tongue and groove manner, the two magnets in both parts hold the system securely in place. The upper and lower base components fit together like a jigsaw puzzle where the two parts are design to fit in a specific way and where there is only on point of entry and one point of exit. To unlock the device, simply pull the two parts away from one another with greater force than the magnets holding force, overriding the magnetic lock of the two magnets.

There are two major components of the current invention. There is the upper component that contains a picatinny rail which allows firearm accessories to mount directly onto. The second part is the lower base component that the upper component attaches to. The base component has two functions; it holds the upper component firmly in a fix position while clamping itself on the firearm picatinny rail.

By placing a magnet in the center of the upper component and offsetting the lower base component magnet position, the present invention can hold and lock in place the two components with continuous magnetic attractive force. The two magnets naturally want to reach attraction equilibrium by being directly center on one another (shortest distance between the two magnets). The offset of the two magnets provide a little distance between them to create continuous force on the upper and lower base components. The magnet size and what material it is made of determine the magnetic attractive force. In the present invention, we use neodymium magnets as the holding and locking mechanism on the device.

DETAILED DESCRIPTION OF THE INVENTION

Figure 1:
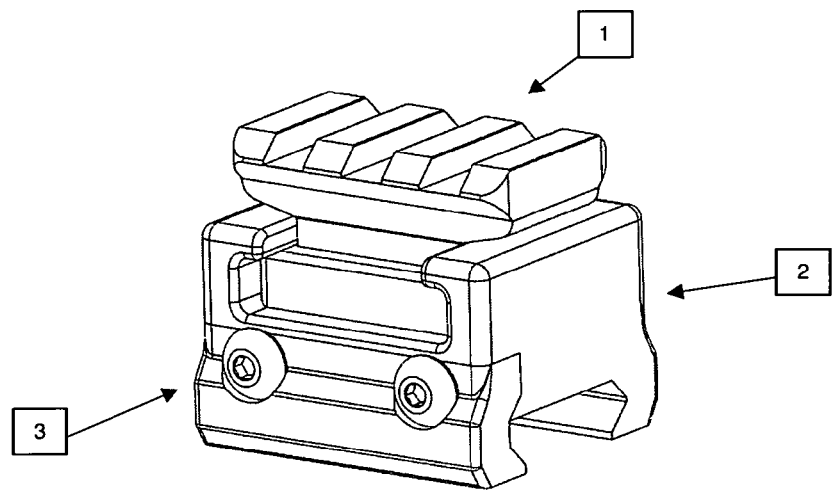
FIG. 1 is a perspective view of the present invention mounting rail device with all working components assembled together.

Referring now to the present invention in more detail, shown in FIG. 1 is a diagram of all the components assembled together. There are three components, the Upper Component FIG. 1 (1), the Lower Base Component FIG. 1 (2), and Picatinny Clamp FIG. 1 (3).

Figure 3:
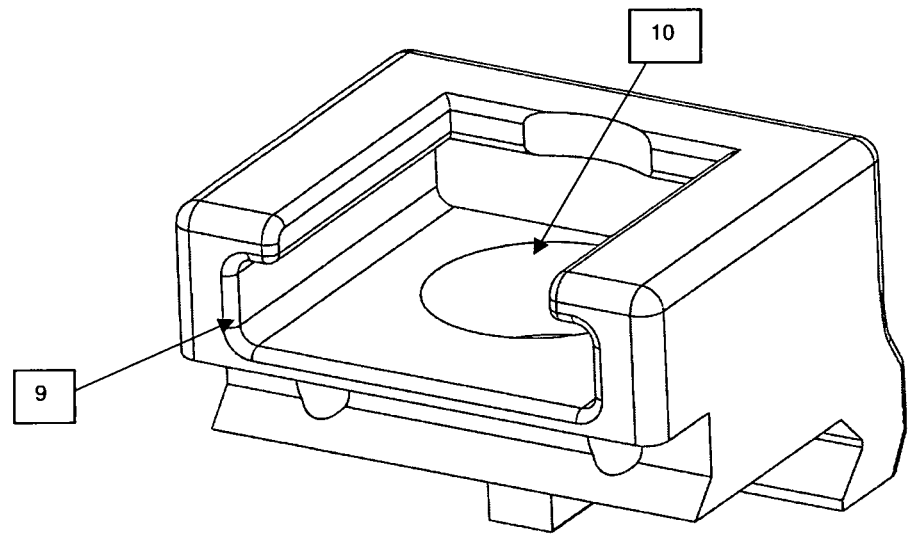
FIG. 3 is a top view of the lower base component with the magnet cavity and the u-shape groove, along the perimeter of the lower base component that holds the upper component in a fix placement.
Figure 4:
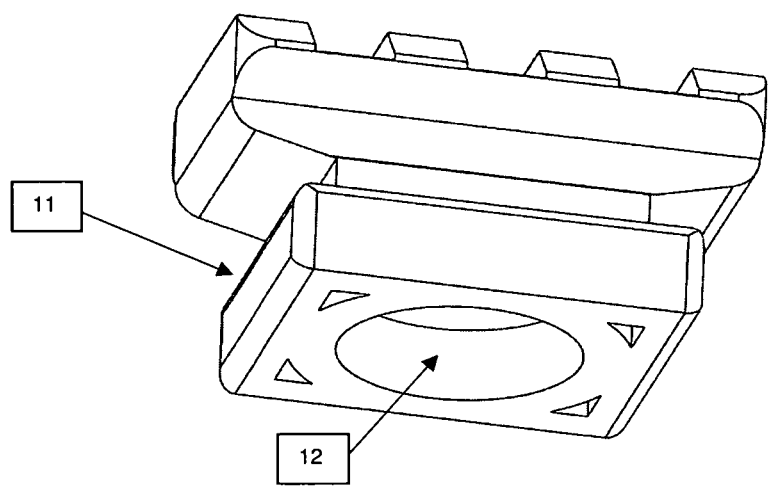
FIG. 4 is a bottom view of the upper component with the magnet cavity. The upper housing has a rail system and a square T-shape base to allow attachment into the u-shape slot of the lower component.

The Upper Component, FIG. 4 (15), has two structures with unique design and functionality. The first structure is the top picatinny rail that allows firearm accessories, with proper mounting devices such as ring clamps, to fit over and attach on it. The second structure is the T-Shape Tongue, FIG. 4 (17), of the upper component which is used to fit into the lower base component U-Shape Groove shown in detail in FIG. 3 (13). When the upper component and lower base component are attached together in a tongue and groove manner, the unique shape of the two components gives the present invention the locking, holding, and precision features. FIG. 1 illustrates the upper and lower base component fitting together as a whole assembly. FIG. 1 (3) is the Picatinny Clamp. The picatinny clamp main purpose is to latch onto the firearm picatinny rail and holds the Lower Base Component firmly in place. It achieves this by fitting over the firearm picatinny rail and fastening into place by two nuts and screw bolts, FIG. 2 (5) and FIG. 2 (11).

Figure 2:
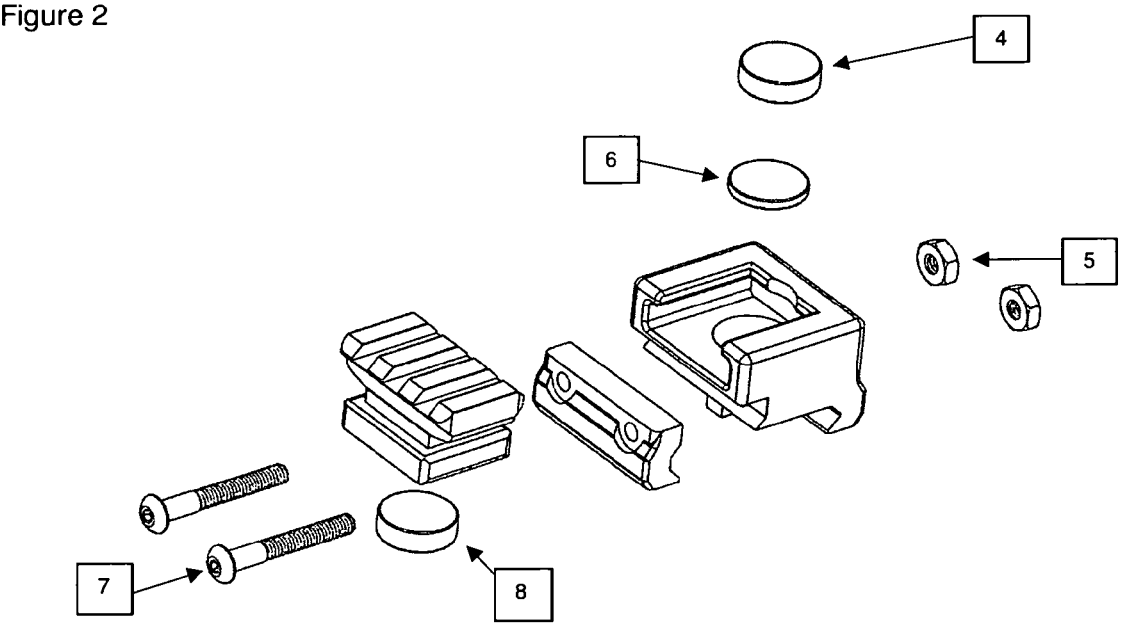
FIG. 2 is a diagram showing all the individual components of the present invention.

FIG. 2 display all the individual components of the present invention disassembled and in more detail. FIG. 2 (4) and FIG. 2 (10) shows two round rare earth neodymium magnets size ¼ inch by ⅛ inch with the attraction force of 18 pounds. Each magnet is placed in the magnet cavity of the upper component and the lower base component. FIG. 3 (14) shows the magnet cavity of the lower base component. The cavity is offset towards the end of the u-shape groove. The offset works in conjunction with the upper component center placement cavity to give the two magnets a continuous magnetic attractive force towards one another, holding the upper component in a constant lock position inside the u-shape groove (north pole and south pole end of the magnets facing each other). The lower base component magnet cavity contains a Base Magnet Shielding, FIG. 2 (6). The shielding first goes inside the cavity before the neodymium magnet does. The magnet sits on top of the shielding. The purpose of the magnet shielding is to reduce any magnetic interference to the firearm bolt carrier assembly movement. Abstraction to the bolt carrier assembly can cause miss firing of the firearm. The magnet shielding can be made of steel, iron, metal alloy, or material which can block or absorb magnetic field.

Figure 5:
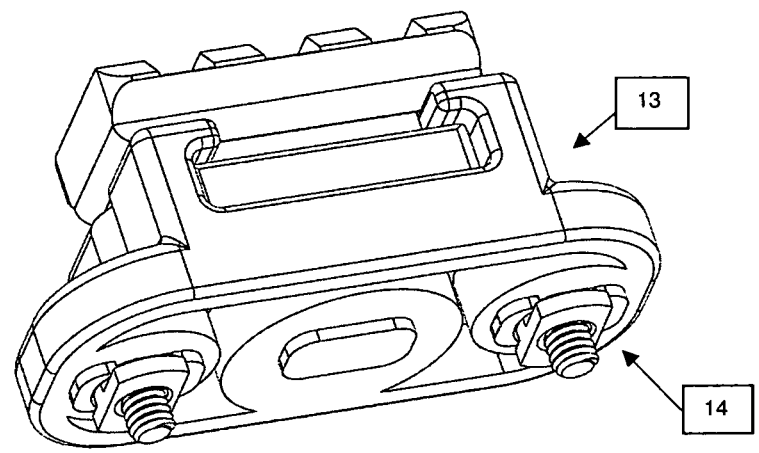
FIG. 5 is a diagram of a lower base component that is designed to mount onto a M-Lok style firearm rail slot system. The base has the unique set of screws and nut used specifically to attach onto M-lok slots.

FIG. 5 (18) illustrates the M-Lok Lower Base Component that is designed to fit into the m-lok slot rail system. The upper component and the u-shape groove on the base component are the same in design as shown on FIG. 1. The only change is the m-lok lower base mounting structure. The screws and nuts are designed in a unique and specific way to only work with the m-lok slots. FIG. 5 (19) is a detail M-lok Locking Mechanism diagram.

Figure 6:
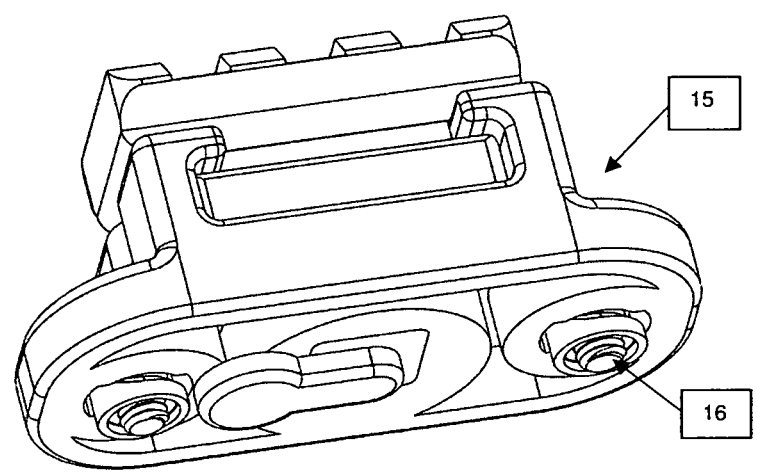
FIG. 6 is a diagram of a lower base component that is designed to mount onto a Keymod style firearm rail slot system. The base has the unique set of screws and nut used specifically to attach onto keymod slots.

FIG. 6 (20) illustrates the Keymod Lower Base Component that is designed to fit into the Keymod slot rail system. The upper component and the u-shape groove on the base component are the same in design as shown on FIG. 1. The only change is the Keymod lower base mounting structure. The screws and nuts are designed in a unique and specific way to only work with the Keymod slots. FIG. 6 (21) is a detail Keymod Locking Mechanism diagram.

Example 1

A magnetic mounting rail that fits over a firearm mounting rail system such as the picatinny rail, m-lok, and keymod to provide quick attachment and/or detachment of firearms accessories and optics. The magnetic firearm mounting rail comprises two main components and a locking mechanism. The upper component has a picatinny rail top for direct accessory mounting and a t-shape bottom for inserting into the lower base component. The t-shape base fills the exact shape of the lower component u-shape slot to hold the whole assembly securely in place. The two main components (the upper and lower base component) fit together in a tongue and groove configuration. The locking mechanism can be made to fit onto or into any firearm railing system, given the correct shape and locking nuts and screw bolts. The two main components are held tightly together by means of a magnetic attractive force between two magnets that are offset from one another. The offset magnets force the two components together in a continuous attractive mode towards one another, allowing the assembly to precisely lock together.

Example 2

The magnetic mounting rail of Example 1 wherein the general usage is to secure different firearm accessories such as and not limited to a scope, laser, red-dot device, iron sight, flip up sight, or flashlight in one quick and easy step. The one step process of attaching and/or detaching of accessory allows multiple platform configurations to be available for the operator of the firearm, making the device modular in design with flexibility in function.

Example 3

The magnetic mounting rail of Example 2 wherein by allowing the operator of the firearm the ability to change accessories at will, the firearm does not permanently need to hold a set of accessories on the firearm railing system. By optimizing which accessories are needed at any given time, the operator can reduce weight on a firearm thereby making the firearm more user friendly. An operator can carry accessories separately in a holster, back pack, or pouch until needed.

Example 4

The magnetic mounting rail of Example 1 wherein by use of multiple upper components, multiple accessories can be interchangeable on one lower base component. This can only work when all magnets are set in same pattern or setup. Both the upper and lower component magnets' north pole ends must be facing upward or the south pole must be facing upward for both, thereby allowing the respective upper component magnet to attract the one lower base component.

Example 5

The magnetic mounting rail of Example 4 wherein one upper component (with a firearm accessory attached to it) can be interchangeable between different lower base component types such as the m-lok slots, keymod slots, and similar systems. Firearms with different mounting slots can all be made to use the same picatinny upper component and u-shape groove, thereby making the present invention a universal or unifying mounting rail such that all mounting systems can use the same magnetic locking mechanism.

Example 6

The magnetic mounting rail of Example 1 wherein multiple magnets per component can be used for the locking mechanism. The present invention allows for a set of 1 to 4 magnets per component, where the number of cavities in the upper component is equal to the number of cavities in the lower component.

Example 7

The magnetic mounting rail of Example 1 wherein the present invention parts can be made by any of many different methods. The parts can be made by a method such as but not limited to CNC milling, 3D printing, casting, or injection molding.

Example 8

The magnetic mounting rail of Example 1 wherein components of the present invention can be made with any of several materials such as nonmagnetic metals and polymers. For example, the Picatinny Clamp, Upper Component, and Lower Base Component can be made with aluminum, brass, copper, or other metal alloys. Examples of polymers and plastic materials are Polypropylene, Nylon, PVC, and, ABS materials.

Example 9

The magnetic mounting rail of Example 1 wherein nuts and bolts used to secure the Picatinny Clamp to the firearm rail are made of a metal such as steel, iron, stainless steel, brass, or a metal alloy. The nuts and bolt screws secure the lower base component clamping system to any firearm railing system.

Example 10

The magnetic mounting rail of Example 1 wherein the magnets are made of a natural earth material or neodymium. A neodymium magnet is the preferred material due to its strong magnetic force. The range for the target magnetic attractive force is the sum of 15 pounds to 25 pounds per magnet.

Example 11

The magnetic mounting rail of Example 1 wherein the present invention can be used on military, competition, hunting, sport, air soft, crossbow, bows, and paintball firearms that have an existing rail system upon which to mount.

Example 12

The magnetic mounting rail of Example 1 wherein the magnetic tongue and groove locking mechanism can be used to mount a camera, video camera, or other electronic device, and where quick locking and precision are needed the locking mechanism is not limited to use with another mounting device. It is a versatile design that is useable where mounting devices are needed.

Example 13

The magnetic mounting rail of Example 1 wherein the present invention can also be mounted on any of a variety of wearables such as a belt, helmet, head band, wrist band, tactical vest, or sport jacket when a suitable holding device is provided, such as a strap, clamp, or holster.

What is claimed:

1. A magnetic mounting rail for use on a firearm mounting rail system comprising:
   a) an upper component comprising:
      i) a top portion that:
         A) is longer than it is wide, and that is wider at mid-height than at its top or bottom; and
         B) has a top side that defines a plurality of transverse parallel slots for mounting a firearm accessory;
      ii) a bottom portion that is a horizontal base comprising a lower surface within which is defined a cavity; and
      iii) a middle portion that serves as a neck to connect the rail at its lower end to the base at its upper end; and wherein the base is wider than the neck such that together they form a T-shaped tongue;
   b) a lower component comprising:
      i) a top portion that defines a U-shaped groove wherein the groove:
         A) has a bottom surface and is enclosed on three sides;
         C) comprises an inward-extending ledge at top of the enclosed sides, thereby forming a C-shaped slot; and
         D) has a lower surface within which is defined a cavity;
         such that when the T-shaped tongue of the upper component is seated in the lower component the neck rests within the C-shaped slot, the base rests within the U-shaped groove, and the cavity in the groove and the cavity in the upper component's base overlap partially on their near sides but the centers of the two cavities are offset relative to one another;
      ii) a mounting feature for mating the lower component to a firearm's universal interface system for firearm accessory components;
   c) an upper magnet that resides within the cavity in the base of the upper component; and
   d) a lower magnet that resides within the cavity of the groove in the lower component;
   whereby when the T-shaped tongue of the upper component containing its upper magnet is seated in the groove of the lower component containing its lower magnet, each magnet remains within its respective cavity and the centers of mass for the two magnets are offset from each other and provide a continuous magnetic attractive force as a holding and locking mechanism for the magnetic mounting rail.

2. The magnetic mounting rail of claim 1, wherein the rail with a plurality of transverse parallel slots is mechanically engaged with a mounting apparatus for a firearm accessory that is selected from the group consisting of: a scope; a laser; a red-dot device; an iron sight; a flip-up sight; and a flashlight.

3. The magnetic mounting rail of claim 2, wherein the mechanical engagement of the firearm accessory is temporary, and the accessory is selected from a plurality of firearm for use during separate respective periods on the same magnetic mounting rail.

4. The magnetic mounting rail of claim 1, wherein:
   a) the lower component is mated for a sustained period of time to a universal interface system on a firearm;
   b) a plurality of firearm accessories are each mated to the rail of a respective upper component for a sustained period of time; and
   c) accessories are changed on the firearm by substituting in the respective upper component for a different accessory while using the same lower component.

5. The magnetic mounting rail of claim 1, wherein:
   a) a firearm accessory is mated to the rail of an upper component for a sustained period of time;
   b) the lower component is changed by substituting a lower component for which the mounting feature for mating to a universal interface system is selected from the group consisting of: clamps for rails; standardized bolt thread configurations; and bolt thread arrangements that have locking key configurations.

6. The magnetic mounting rail of claim 1, wherein at least one of the surfaces that defines a cavity, defines a plurality of cavities within each of which a respective magnet resides.

7. The magnetic mounting rail of claim 1, wherein at least one of the upper component and lower component is the product of a manufacturing process that is selected from the group consisting of: computer numerical controlled (CNC) machining; 3D printing; casting; and injection molding.

8. The magnetic mounting rail of claim 1, wherein at least one of the upper component and lower component comprises a composition of matter that is selected from the group consisting of a non-magnetic metal and a polymer.

9. The magnetic mounting rail of claim 8, wherein the non-magnetic metal is selected from the group consisting of aluminum, brass, and copper.

10. The magnetic mounting rail of claim 8, wherein the polymer is selected from the group consisting of polypropylene, nylon, polyvinylchloride (PVC), and acrylonitrile-butadine-styrene (ABS) thermoplastic.

11. The magnetic mounting rail of claim 1, wherein the mounting feature for mating the lower component to a firearm's universal interface system is a clamp for a rail, and the clamp comprises at least one nut or bolt having a composition of matter that is selected from the group consisting of iron, steel, stainless steel, and brass.

12. The magnetic mounting rail of claim 1, wherein at least one magnet consists of a composition of matter that is selected from the group consisting of neodymium and natural earth material.

13. The magnetic mounting rail of claim 1, wherein the total continuous magnetic force provided by the offset magnets is selected from a range of from 30 to 50 pounds.

14. The magnetic mounting rail of claim 1, wherein the lower component is mated to a firearm's universal interface system, and the firearm is selected from the group consisting of military firearms, competition firearms, hunting firearms, sport firearms, air-soft firearms, paintball firearms, crossbows, and bows.

15. The magnetic mounting rail of claim 1, wherein the accessory is selected from the group consisting of a camera, a videocamera, and an electronic device that is neither a camera nor videocamera.

16. The magnetic mounting rail of claim 1, wherein the accessory is an accessory for which quick and precise locking are needed for mounting.

17. The magnetic mounting rail of claim 1, wherein the mounting feature of the lower component is mated to an interface system on a wearable item that is selected from the group consisting of belts, helmets, headbands, wrist bands, tactical vests, sport jackets, straps, clamps, and holsters.

\* \* \* \* \*